Figure 1:
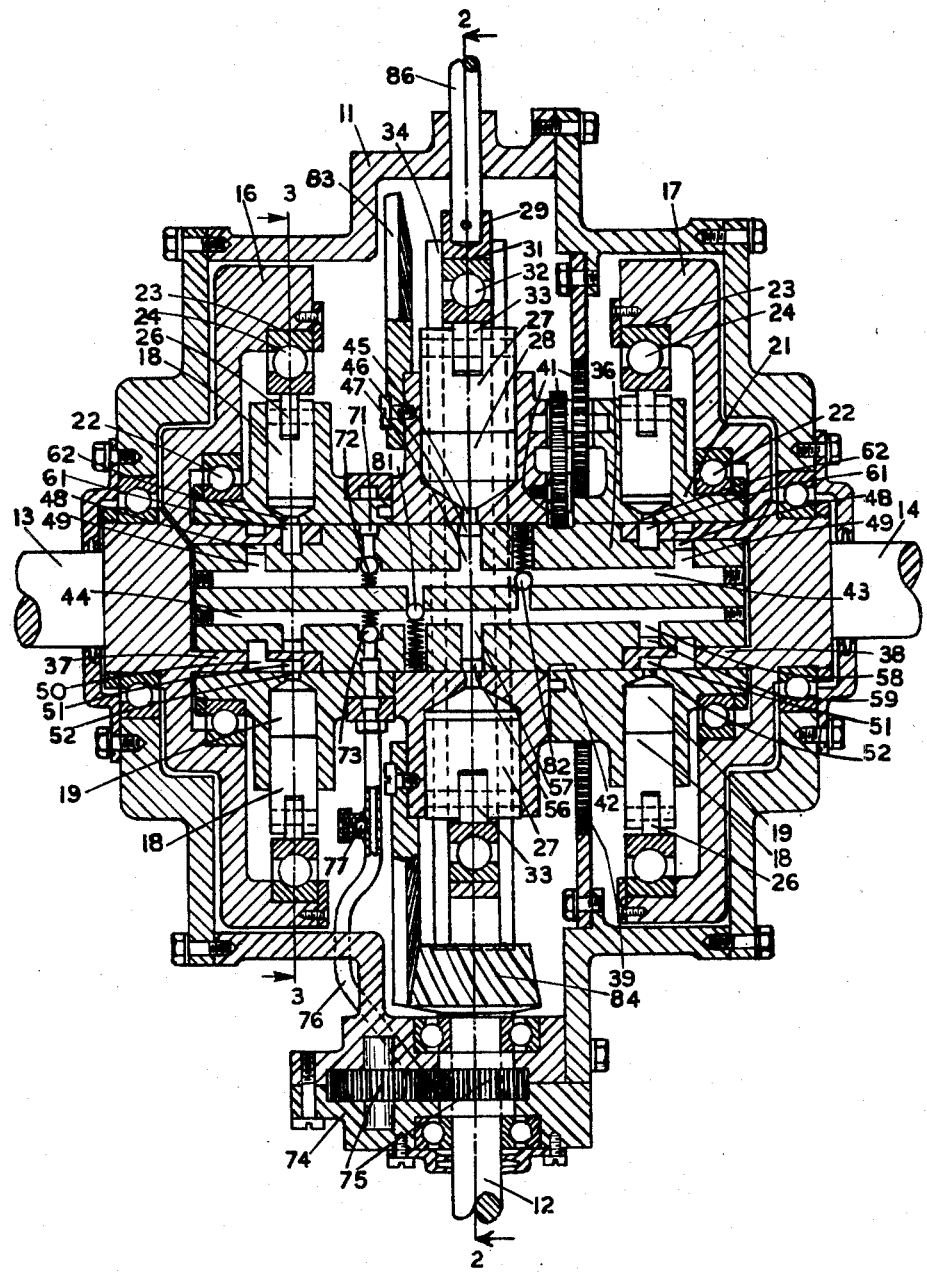

Jan. 29, 1952   K. H. NICHOLLS ET AL   2,583,704
ROTARY PUMP AND MOTOR DIFFERENTIAL
HYDRAULIC TRANSMISSION
Filed Aug. 21, 1946   3 Sheets-Sheet 3

INVENTORS:
K.H. NICHOLLS.
A.G. ROSE.
BY
Munn, Liddy & Glaccum
ATTORNEYS.

Patented Jan. 29, 1952

2,583,704

UNITED STATES PATENT OFFICE 2,583,704

ROTARY PUMP AND MOTOR DIFFERENTIAL HYDRAULIC TRANSMISSION

Kenneth Howard Nicholls, Bromley, and Alfred German Rose, Gainsborough, England

Application August 21, 1946, Serial No. 691,994
In Great Britain August 28, 1945

9 Claims. (Cl. 60—53)

The invention relates to hydraulic mechanism of the kind in which a driving torque is transmitted from a rotary hydraulic pump to a rotary hydraulic motor, the former being of relatively variable delivery for the purpose of varying their relative speeds. The pump and the motor are of the type comprising relatively rotatable reaction members and body portions. Pumps and motors of this type may be similar in construction and capable of operating either as pumps or motors depending on the attendant circumstances. For the sake of clarity of description, such a pump or motor will be referred to hereinafter as a pump when acting as a driving member and a motor when acting as a driven member, it being understood that the motors in certain circumstances may have, at least in effect, a pumping action, and similarly the pumps the action of motors.

A difficulty arising with apparatus of this kind is that the efficiency of the apparatus is apt to be seriously impaired by the occurrence of oil flow losses, internal friction losses, and the like. It is an object of the invention to provide an apparatus of this kind in which the effect of such losses is minimized. A further object of the invention is to provide a differential mechanism in which the differential operation is brought about simply through the action or reaction, as the case may be, of a hydraulic medium.

According to the invention, therefore, there is provided a hydraulic mechanism of the kind described, wherein the body portion of a hydraulic pump and the driving part of a pair of hydraulic motors are arranged to be driven simultaneously from a common source of power, and wherein the conduits of the conduit member are arranged to connect the pump to the pair of motors in parallel so that they are capable of operating differentially. When using a pump and motors of the kind wherein the pumping and motor action is non-reversible except by change in the direction of pump rotation, the conduits are so arranged that upon operation of the pump by rotation of its body portion in one direction a relative rotation is caused between the reaction members of the motors and their body portions in a direction opposite to the rotation of the body portions.

According to the invention the body portions of the pump and motors are driven simultaneously by the input shaft, the reaction member of the variable pump is fixed against rotation, and the reaction member of each motor drives a driven shaft, neutral is acquired when the capacity of the pump is the same as the combined capacities of the two motors. Forward operation begins when the capacity of the pump falls below that of the combined capacities of the two motors; that is when the eccentricity of the pump reaction member is reduced. One to one or direct forward drive is attained when the capacity of the pump reaches zero, thus establishing a fluid block between the driving and driven shafts in the nature of the conventional fluid clutch. When the reaction member is continued beyond the zero point an overdrive stage of operation is established. To effect reverse drive the reaction member of the pump is moved in an opposite direction from the neutral position (where the capacity of the pump equals that of the two motors combined) to a position where the capacity of the pump exceeds that of the combined capacities of the two motors.

Since the conduits of the conduit member form with the pump and motors a closed hydraulic system, it is desirable that means should be provided for replacing any of the hydraulic medium that may escape from the system by leakage. Such means may conveniently be in the form of replenisher valves connecting the conduits with a source of supply of hydraulic medium; or, if desired, the whole apparatus may be immersed in the hydraulic medium, in which case replenishment of the conduits would continue as required so long as they remain immersed. In the latter case, valves connecting the conduits with the bulk of hydraulic medium may also be used if desired.

It will be understood that the terms "body portion" and "reaction member," as applied to the pump, and the terms "driving member" and "driven member," as applied to the motors are interchangeable depending on the construction of the pump or motor used and the attendant circumstances.

The pump may be of the well-known type wherein a series of cylinders are arranged in the body portion with their axes extending radially and each accommodating a piston, reciprocation of the pistons being brought about, upon relative rotation between the body portion and the reaction member, by engagement of the outer ends of the pistons (e. g., by a roller or rollers freely mounted on the pistons) with an eccentric track formed in the reaction member. The motors may be of similar type, having a series of radially movable pistons housed in a driven member and arranged to engage an eccentric track formed on a driven member. It will be understood, however, that other types of motor and pump may be used without departing from the scope of the invention. Thus, for example, pumps and motors of the swash plate type having pistons and cylinders arranged with their axes parallel to the axis of rotation may be used; or again, pumps and motors of the type employing blades or vanes may be used. Also, the pumps may be of a type different from that of the motor.

By way of example, the invention will now be described in greater detail with reference to the accompanying drawings, as applied to a variable speed and differential hydraulic transmission suitable for use in a road vehicle.

Figure 2:
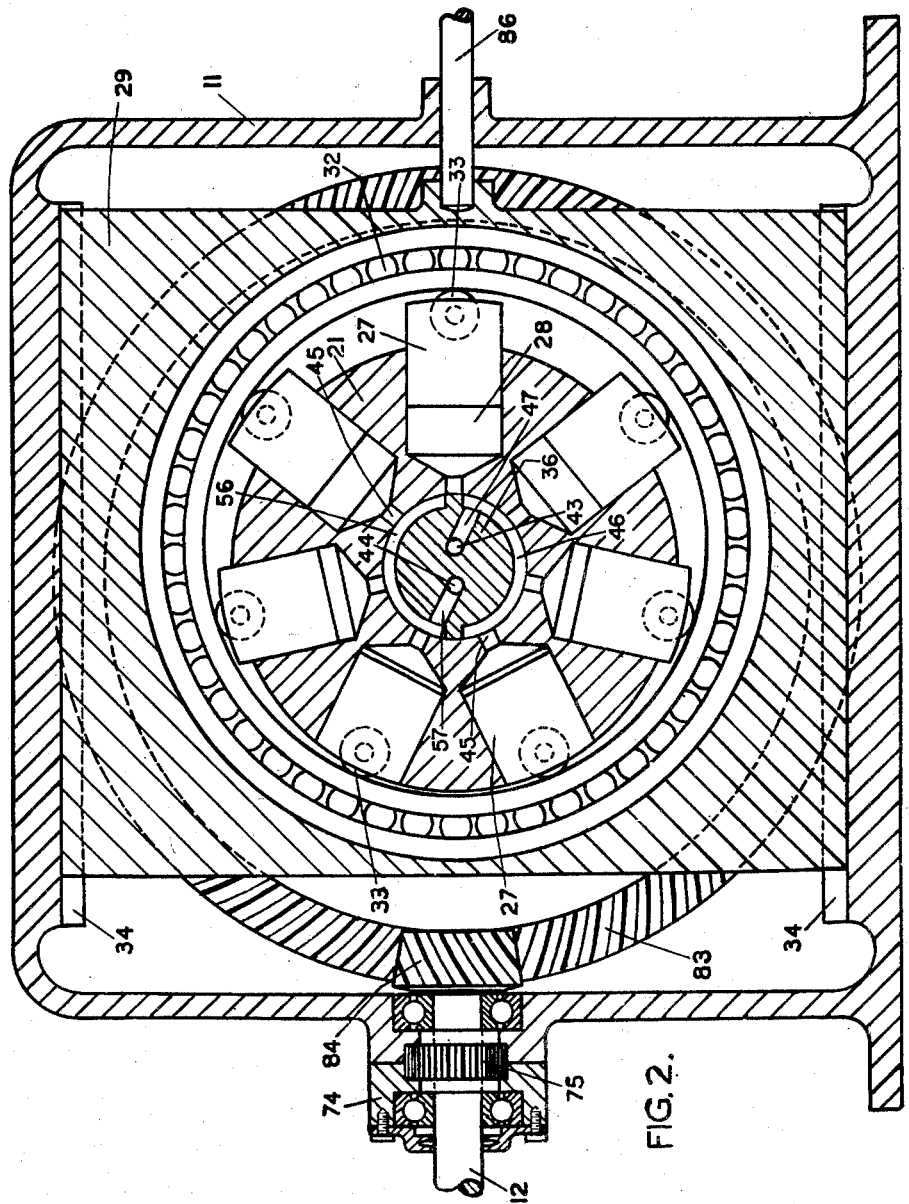
Figure 3:
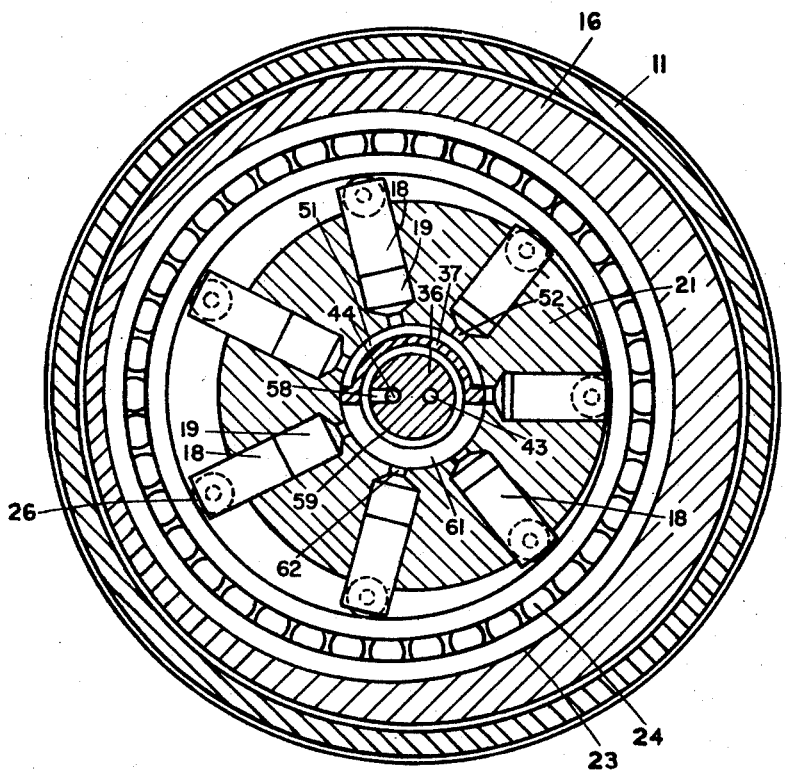

In the drawings:

Figure 1 is a conventional cross-section of a gear according to the invention, and Figures 2 and 3 are conventional cross-sections of the hydraulic transmission taken, respectively, along the lines 2—2 and 3—3 in Figure 1.

Referring to the drawings, the hydraulic transmission is contained in a main casing 11 which is made in several parts for purposes of facilitating assembly. The casing is formed with bearings for an input shaft 12, intended to be connected to the engine of the road vehicle, and for two co-axial output shafts 13 and 14 intended to be connected one to each of a pair of road wheels of the vehicle. Attached to the output shafts 13 and 14, respectively, are the driven members 16 and 17 of a pair of oil motors of the radial piston type described above, the driving members of the motors each consisting of a series of radial cylinders 19 each containing a piston 18, the cylinders 19 being formed in an integral unitary body portion 21 arranged for rotation about the common axis of the output shafts 13 and 14 in bearings 22 housed in the driven members 16 and 17 respectively. The driven members 16 and 17 are each formed with an eccentric track 23 in which is secured a ball bearing 24 the inner race of which is arranged to bear on the ends of the pistons 18 which are provided with freely mounted rollers 26 for this purpose.

Also formed in the body portion 21, at a position between the two motors, is the body portion of a pump, generally similar in construction to the two motors and consisting of a series of radial pistons 27 arranged to reciprocate in a series of cylinders 28 formed in the body portion 21, the pistons 27 being somewhat larger in diameter than the pistons 18. The reaction member 29 of the pump comprises an eccentric track 31 in which is housed a ball-bearing 32 the inner race of which is arranged to bear against rollers 33 freely mounted in the ends of the pistons 27. The reaction member 29 of the pump is slidably mounted in tracks 34, formed in the main casings 11, for movement in a direction normal to the axis of rotation of the body portion 21 for the purpose of varying the eccentricity of the track 31 and thus varying the capacity of the pump and rendering it capable of variable delivery.

Arranged in a central bore of the body portion 21 is a conduit member 36 which extends into tubular port extensions 37 and 38 of the driven members 16 and 17, respectively. The conduit member 36 is prevented from rotating by means of an epicyclic gear train consisting of a stationary internal gear 39 attached to the casing 11, intermediate gearing 41 freely mounted in bearings in the body portion 21 and a gear 42 cut in the periphery of the conduit member 36, the ratio and arrangement of the gearing being such that the conduit member 36 is driven at the same rate as the body portion 21 but in the opposite direction thereto so that it remains stationary during rotation of the body portion 21.

The pump is connected to the two motors in parallel by means of two closed conduits 43 and 44 in the conduit member 36, the conduit 43 being referred to as the pressure conduit while the conduit 44 is referred to as the intake conduit for the sake of clarity. Oil is fed to the pressure conduit 43 by the pistons 27 during their passage around approximately one half of the periphery of the conduit member 36, the oil being passed from the cylinders 28 through ports 45 into a groove 46 which extends approximately half way around the periphery of the conduit member, and from the groove 46 through a port 47 to the conduit 43. From the conduit 43 the oil is fed to a pair of grooves 48 through ports 49 from which it passes through ports 50 in the tubular extensions 37 and 38 to a further pair of grooves 51 extending over approximately half the periphery of the tubular extensions 37 and 38. From the grooves 51, the oil is fed to the cylinders 19 through ports 52.

It will thus be seen that upon operation of the pump by rotation of the body portion 21 oil is fed from pump pistons 27 to opposing motor cylinders 19 through the grooves 51, so that the driven members 16 and 17 are caused to rotate, relatively to the body portion 21, in a direction opposite to that of rotation thereof when the pump is adjusted to have a capacity greater than that of the combined capacities of the two motors. The intake conduit 44 connects the cylinders 28 of the pump to the cylinders 19 of the two motors in a similar manner to that described in relation to the conduit 43, the oil flowing from the cylinders 19 through ports 62 to grooves 61, extending approximately half way around the tubular extensions 37 and 38, which feed grooves 59 in the conduit member 36, and from there through ports 58 to the conduit 44 through which it flows through a port 57, leading to a groove 56, diametrically opposed to the groove 46, which communicates with the cylinder 28 through the ports 45.

Any leakage from the conduits drains into a suitable reservoir in the casing 11, and in order to ensure that the whole hydraulic system remains under adequate initial pressure, there is provided a recuperator chamber 71 which is connected to the conduits 43 and 44 by spring-loaded ball valves 72 and 73, respectively, the recuperator chamber being supplied with oil from a gear pump 74 through a pipe 76 provided with a pressure relief valve 77, the inlet side of the pump 74 being connected to the reservoir in the casing 11. The pump 74 comprises a pair of gears 75 one of which is secured to the input shaft 12. Spring loaded safety valves 81 and 82 are also provided, the valve 81 connecting the conduit 43 to the conduit 44 while the valve 82 connects the conduit 44 to the conduit 43.

Attached to the body portion 21 is a bevel gear 83 arranged in engagement with a bevel pinion 84 formed integrally with the input shaft 12, and it will be seen that, upon rotation of the input shaft 12, the body portion 21 is caused to rotate relatively to the conduit member 36, carrying with it the body portions of the pump and two motors, and the driving torque of the input shaft 12 is transmitted to the driven members 16 and 17 at varying ratios in accordance with the capacity setting of the pump, as described above.

Variation in the capacity setting of the pump is brought about, as explained above, by sliding the reaction member 29 in the tracks 34, such sliding movement being brought about by a rod 86 arranged to be operated by any suitable controlling device from any convenient position on the vehicle.

It will be understood that if the pump adjustment is passed through the zero delivery position to the opposite side, the port 58 will become the pressure or supply conduit with the result that the members 16 and 17 will overrun the member 21 thus giving them a higher speed in the same direction.

We claim:
1. A hydraulic mechanism of the kind described, comprising a hydraulic pump having a body portion and a reaction member, at least two hydraulic motors each comprising a driving member and a driven member, an output shaft connected to each of said driven members, means for rotating the body portion of the pump and the driving members of the motors simultaneously at the same rate from a common source of power, means for varying the rate of delivery of the pump at a given rate of rotation of the body portion, and a common stationary conduit member having conduits connecting the body portion of the pump to the driving members of the two motors in parallel so as to allow differential operation of the motors.

2. Apparatus as in claim 1, wherein the pump is of the type in which a series of cylinders are arranged in the body portion with their axes extending radially and each accommodating a piston, and the reaction member comprises a track disposed eccentrically with respect to the axis of rotation of the body portion, the outer ends of the pistons being arranged to engage the track.

3. Apparatus as in claim 2, wherein the motors are of the type in which a series of cylinders are arranged in the driving member with their axes extending radially and each accommodating a piston, and the driven member comprises a track disposed eccentrically with respect to the axis of rotation of the driving member, the outer ends of the pistons being arranged to engage the track.

4. Apparatus according to claim 2, wherein the reaction member of the pump is slidably mounted for movement in a direction normal to the axis of rotation of its body portion for the purpose of varying the rate of delivery of the pump.

5. A variable speed and differential hydraulic transmission, comprising a casing, a hydraulic pump having a body portion and a reaction member, a pair of hydraulic motors each comprising a driving member and a driven member, the body portion of the pump and the driving member of each motor being connected together to form an integral unitary body member rotatably mounted within the casing, the reaction member of the pump being adjustable for the purpose of varying the delivery of the pump, an input shaft mounted in bearings in the casing and connected by gearing to the body member, a pair of output shafts mounted in bearings in the casing for rotation about a common axis coincident with the axis of rotation of the body member and carrying respectively the driven members of the two motors, a stationary cylindrical common conduit member mounted in a central bore of the body member, and conduits in said conduit member connecting the body portion of the pump to the driving members of the two motors in parallel so as to allow differential operation of the motors.

6. Apparatus as in claim 5, wherein the pump is of the type in which a series of cylinders are arranged in the body portion with their axes extending radially and each accommodating a piston, and the reaction member comprises a track disposed concentrically with respect to the axis of rotation of the body portion, the outer ends of the pistons being arranged to engage the track.

7. Apparatus as in claim 6, wherein the motors are of the type in which a series of cylinders are arranged in the driving member with their axes extending radially and each accommodating a piston, and the driven member comprises a track disposed eccentrically with respect to the axis of rotation of the driving member, the outer ends of the pistons being arranged to engage the track.

8. A variable speed and differential hydraulic transmission, comprising a casing, a hydraulic pump having a body portion and a reaction member, a pair of hydraulic motors each comprising a driving member and a driven member, the body portion of the pump and the driving member of each motor being connected together to form an integral unitary body member rotatably mounted within the casing, the reaction member of the pump being slidably mounted in the casing for movement in a direction normal to the axis of rotation of the unitary body member for the purpose of varying the delivery of the pump, an input shaft mounted in bearings in the casing and arranged to drive the body member, a pair of output shafts mounted in bearings in the casing for rotation about a common axis coincident with the axis of rotation of the body member and carrying respectively the driven members of the two motors, a stationary cylindrical common conduit member mounted in a central bore of the body member, and conduits in said conduit member connecting the body portion of the pump to the driving members of the two motors in parallel so as to allow differential operation of the two motors.

9. Apparatus as in claim 8, wherein the cylindrical conduit member is maintained stationary relatively to the casing by means of an epicyclic gear train comprising a stationary internal gear attached to the casing, a gear cut in the periphery of the conduit member, and intermediate gearing freely mounted on the unitary body member and arranged in engagement with the integral gear and the gear on the conduit member, the ratio and arrangement of the gearing being such that no rotation is imparted to the conduit member during rotation of the unitary body member.

KENNETH HOWARD NICHOLLS.
ALFRED GERMAN ROSE.

REFERENCES CITED

The following references are of record in the file of this patent:

UNITED STATES PATENTS

| Number | Name | Date |
| --- | --- | --- |
| 1,044,846 | Barbarou | Nov. 19, 1912 |
| 1,126,812 | McQueen | Feb. 2, 1915 |
| 1,136,363 | Pepper | Apr. 20, 1915 |
| 1,203,450 | Allan | Oct. 31, 1916 |
| 1,227,055 | Kellogg | May 22, 1917 |
| 1,497,741 | Schneider | June 17, 1924 |
| 1,610,405 | Wingquist | Dec. 14, 1926 |
| 1,695,289 | Lee | Dec. 18, 1928 |
| 1,697,253 | Schneider | Jan. 1, 1929 |
| 1,904,496 | Maw | Apr. 18, 1933 |
| 1,998,922 | Chamberlain et al. | Apr. 23, 1935 |
| 2,176,401 | Johns | Oct. 17, 1939 |
| 2,220,626 | Bischof | Nov. 5, 1940 |
| 2,226,481 | Rose | Dec. 24, 1940 |
| 2,371,922 | Saito | Mar. 20, 1945 |